United States Patent [19]

Eblovi

[11] 3,715,579

[45] Feb. 6, 1973

[54] RATE DECODER WITH ACTIVE FILTERS

[75] Inventor: Roger Eblovi, Fairport, N.Y.

[73] Assignee: General Signal Corporation, Rochester, N.Y.

[22] Filed: Oct. 22, 1970

[21] Appl. No.: 82,916

[52] U.S. Cl. ............246/187 A, 317/147, 340/171 R

[51] Int. Cl. .........................B60l 15/06, H01h 47/20

[58] Field of Search..246/187 A; 340/121 R, 171 PF, 340/171 A; 317/DIG. 5, 147

[56] References Cited

UNITED STATES PATENTS

| | | | |
|---|---|---|---|
| 3,187,234 | 6/1965 | Muranaka et al. | ..................317/147 |
| 3,320,576 | 5/1967 | Dixon et al | ...................340/171 R X |
| 3,096,056 | 7/1963 | Allison | ...........................246/187 A |

*Primary Examiner*—Drayton E. Hoffman
*Assistant Examiner*—George H. Libman
*Attorney*—Harold S. Wynn

[57] ABSTRACT

The decoding system provides a control signal in response to an input of one of a plurality of selected code rates. The improvement includes a band-pass filtering means for each code rate which is responsive to the input for producing the output when the rate is within the band of the filter. A comparator means has a triggering level responsive to the filter output and produces a step signal when the amplitude of the filter output exceeds the triggering level. An output means responsive to the step output of the comparator produces the control signal when the step output signal occurs at at least a minimum rate.

13 Claims, 3 Drawing Figures

RATE DECODER WITH ACTIVE FILTERS

BACKGROUND OF INVENTION

The invention disclosed herein relates to decoding apparatus and in particular to such apparatus using active filters for differentiating between the different input code rates.

The control systems operative for governing the operation of railroad vehicles via coded track circuits generally utilize enormous packages of passive filter networks for receiving and filtering coded information from the tracks or other transmission device. The signals are then amplified and various codes therein are translated into command signals for governing the operation of the vehicle. With such apparatus, various safety precautions must be utilized in order to accurately detect failures and provide a fail-safe mode of operation. Generally, the most costly and usually the most cumbersome safety relays are utilized in many respects of the control system in order to insure that failures will occur on the side of safety.

With the advent of active filtering devices and the resultant minimal space requirements, the inclusion of such cumbersome safety relays in the apparatus seems to defeat the purpose of miniaturization. A system has, therefore, been devised using active filtering networks, and a bank of non-vital multiple contact relays which in the present configuration conforms with the required safety requirements of railroads.

It is therefore an object of the present invention to provide a system which obviates one or more of the disadvantages and limitations of prior arrangements.

It is another object of the present invention to provide a rate decoding system using active components and non-vital relays.

It is another object of the present invention to provide improved safety checking circuits.

SUMMARY OF THE INVENTION

A decoding system has been provided for generating a control signal in response to an input of one of the plurality of selected code rates. The improvement comprises band-pass filtering means for each code rate responsive to the input for producing an output when an input is within the band of said filter means. Comparator means having a triggering level responsive to the filter means output produces a step signal when the amplitude of the filtering means output exceeds the triggering level and output means responsive to the step output of the comparator produces a control signal when the step output signal occurs at least at a minimum rate.

For a better understanding of the present invention, together with other and further objects thereof, reference is had to the following description taken in connection with the accompanying drawings, while its scope will be pointed out in the appended claims.

DESCRIPTION OF THE PREFERRED EMBODIMENT

It is contemplated that the present invention will be used for control of a railroad vehicle. However, the application may be extended to other such system which would conveniently utilize the apparatus shown. It is to be understood that the apparatus shown generally is carried on a vehicle which has appropriately designed receiver components for initially detecting the transmitted signals.

Figure 1:
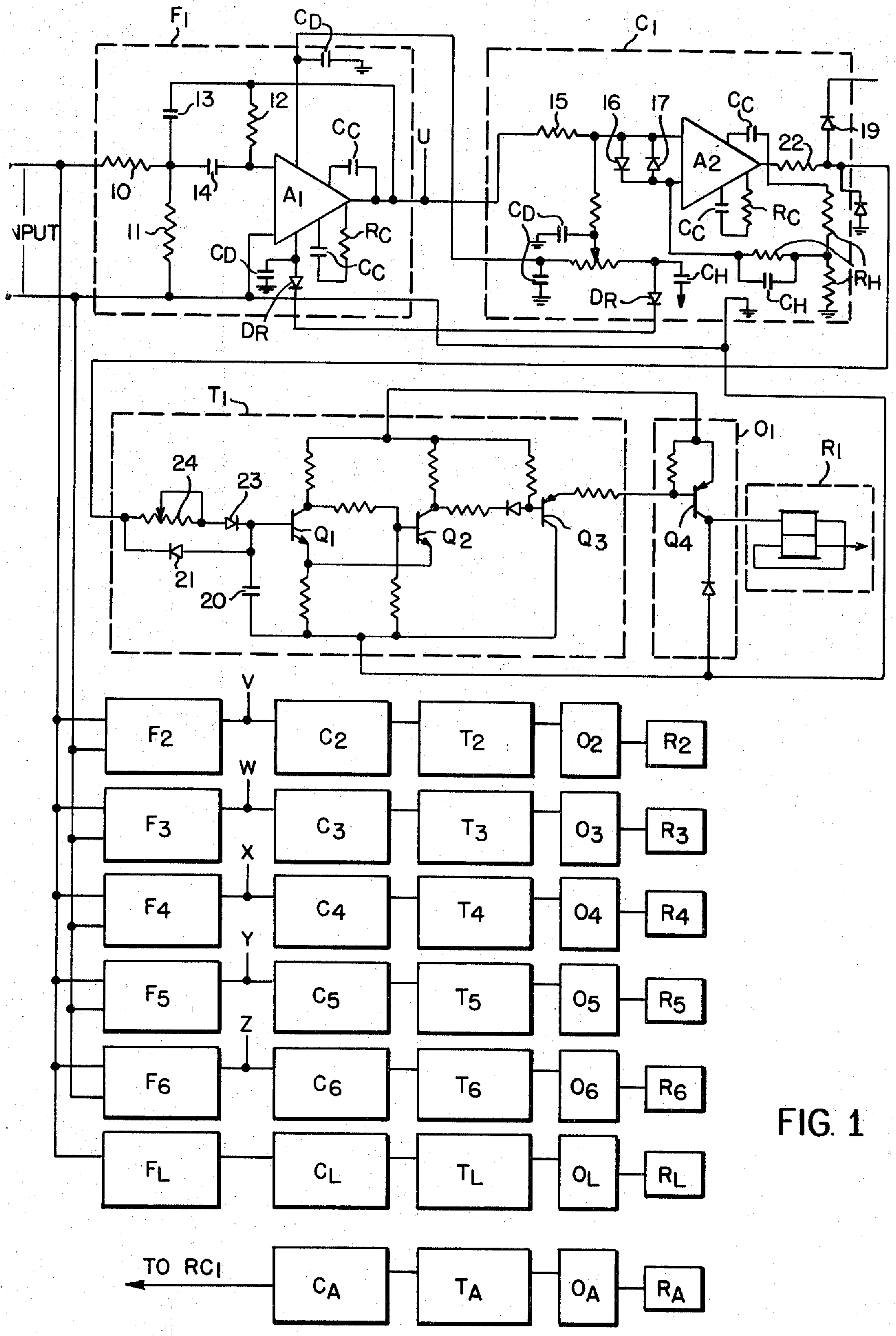
FIG. 1 is a partial block diagram, partial schematic of one embodiment of the present invention.
Figure 2:
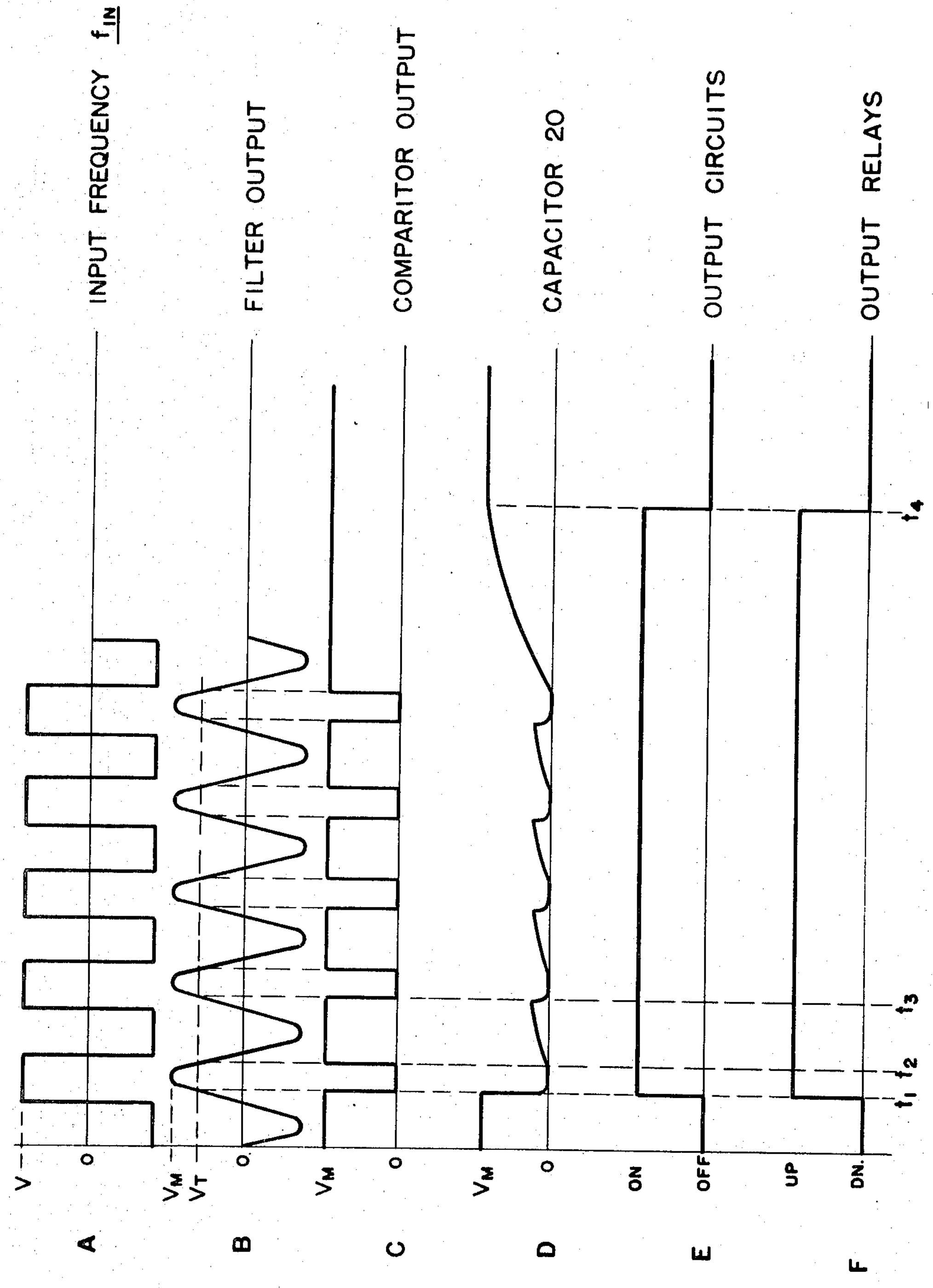
FIG. 2 shows waveforms at significant stages of the apparatus.

This system shown utilizes six code rates which may be either added to or diminished as the needs of the application dictate. The codes are of low frequency ranging from approximately 5 to 16 cycles per second, which frequencies are indicative of various ranges of speed from low to high respectively. If, for example, an $f_3$ code rate were transmitted and received, the input frequency $f_3$ would be imposed upon the input terminals appropriately labelled on FIG. 1. The filters $F_1$ through $F_6$ and $F_L$ are coupled in parallel to the input terminals. The $F_3$ filter detects the code $f_3$ and transmits the signal to its output. The input signal shown in FIG. 2 at A, is generally of a square wave type and the filters $F_1$, $F_2$ and $F_4$ through $F_6$ are tuned so as to attenuate the $f_3$ signals to such a low level as to be useless. The $F_3$ filter, however, tuned to the frequency $f_3$ becomes activated and transmits a sineusoidal output following the frequency of the input $f_3$. The sineusoidal output of filter $F_3$, shown in FIG. 2, waveform B is fed to a comparator $C_3$. The comparator $C_3$ as well as the others shown in the drawing provide a steady D.C. output when in a standby mode. However, the transmission of the output from filter $F_3$ causes the comparator $C_3$ to generate a step output shown in FIG. 2C at time $t_1$. This step output occurs when the sineusoidal input to the comparator achieves a predetermined amplitude level as shown in drawing in waveforms B of FIG. 2 at $V_T$. Each time the waveform B achieves the triggering level $V_T$, the comparator output steps from its steady output $V_M$ to zero. As the wave swings below the triggering voltage $V_T$ as at time $t_2$, the comparator output jumps to its normal steady D.C. output $V_M$. This occurs as the sineusoidal output of the filter $F_3$ exceeds $V_T$ repetitively. A Schmitt trigger circuit $T_3$ responds to the step of the comparator output at time $t_1$ to provide a signal which effectively picks the output relay $R_3$. It is sufficient to say that as the comparator output goes to zero, the output of the Schmitt trigger $T_3$ and the output circuit $O_3$ are turned on and the relay $R_3$ picks up. Front contacts on the relay $R_3$ conduct a signal which establishes a mode of operation for the vehicle in accordance with the frequency $F_3$, which frequency is indicative of approximately a half of the maximum permissible speed of the vehicle.

A circuit arrangement including the serially coupled filter $F_L$, comparator $C_L$, trigger $T_L$, output circuit $O_L$ and relay $R_L$ are connected in parallel with the input of the apparatus and this portion of the system is responsive to all of the anticipated input frequencies, the filter $F_L$ being a low pass filter and having a band-width from zero to approximately 20 cycles per second. This is used to check the integrity of the system, and as will be explained further in the discussion, is part of the safety apparatus provided.

Figure 1A:
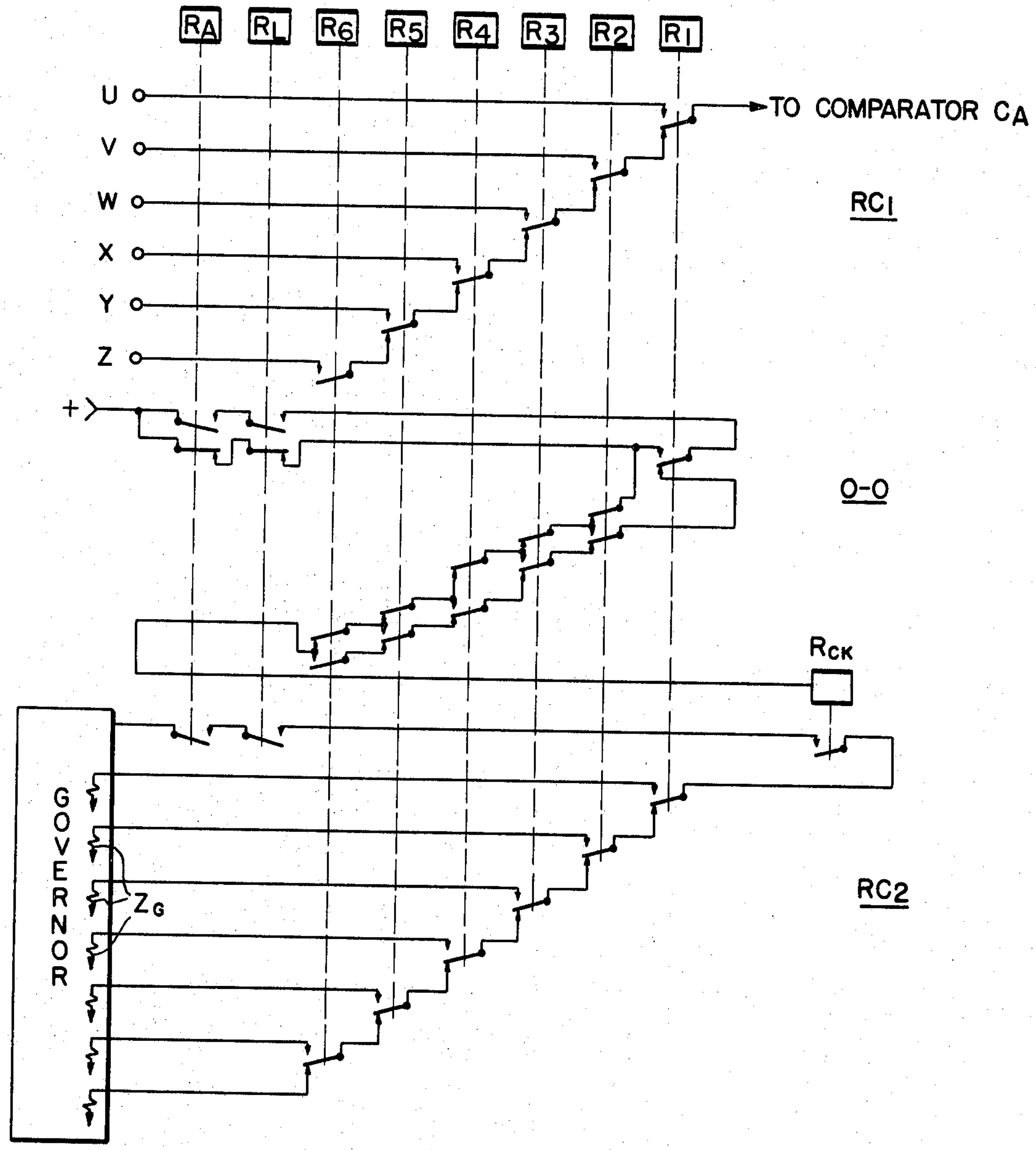
FIG. 1A is a configuration showing the safety circuits utilized in the invention.

Another checking system includes a restrictive circuit network $RC_1$ shown in FIG. 1A and a comparator $C_A$, a trigger $T_A$, output circuit $O_A$ and relay $R_A$. The inputs to the restrictive circuit $RC_1$ are coupled to the outputs U through Z of filters $F_1$ through $F_6$ respectively. This circuit also is part of the checking apparatus. It is sufficient to note that only the most restrictive output from the filters $F_1$ through $F_6$ can pass through the restrictive circuit network $RC_1$ to activate the comparator $C_A$ and the remaining circuitry for maintaining the relay $R_A$ energized.

The operation of the filtering networks will be described with respect to filter $F_1$ and its associated circuitry, and it is to be understood that the remaining filters $F_2$ through $F_6$ and $F_L$ operate substantially in the same manner except for the range of the frequency at which they operate their respective output relays. The input to the filter $F_1$, includes a network consisting of resistors 10, 11 and 12 and capacitors 13 and 14. The resistor 12 and capacitor 13 are coupled to the output of an operational amplifier $A_1$ by a feedback loop shown in the drawing. This combination of resistive and capacitive elements and the amplifier $A_1$, which in this case has a gain of one, has a characteristic impedance which has been adjusted by manipulation of the resistance values to be maximally responsive to a 5 hertz signal. With a Q of approximately 10, the 3 DB points for the filter $F_1$ is ±5 percent of 5 hertz. The filter $F_1$, therefore, is a relatively narrow 5 hertz band-pass filter. Capacitor $C_D$ shown in the filter $F_1$ is for decoupling the operational amplifier $A_1$ from D.C. The resistive and capacitive elements $R_C$ and $C_C$ are frequency compensation circuits for the operational amplifier $A_1$. It is to be understood that the amplifier $A_1$ is of the integrated circuit type and such compensating networks are necessary and well known to those familiar with the art. The diodes $D_R$ are used to prevent short circuit damage to their associated integrated circuit amplifiers $A_1$ and $A_2$ if the power supply polarity is inadvertently reversed. The output of the amplifier $A_1$ is fed to the input of the comparator $C_1$ and also to the input U of the restrictive network circuit $RC_1$. Output of the filter $F_1$ is sineusoidal and fed through current limiting resistor 15 to the input of amplifier $A_2$. The diodes 16 and 17 coupled oppositely across the inputs of the amplifier $A_2$ are used to balance the inputs to the dual input amplifier $A_2$. Again, capacitor $C_D$ is used to decouple the apparatus from unwanted direct current signals. Comparator $C_1$ responds to an input signal of approximately 3½ volts above ground by its appropriate biasing circuitry.

Resistors $R_H$ and capacitor $C_H$ provide hysteresis to the amplifier $A_2$ so that false triggering is less likely. The comparator $C_1$ produces an output shown in FIG. 2 waveform C and is a result of the input from the filter $F_1$ exceeding the triggering voltage $V_T$.

Schmitt trigger $T_1$ is responsive to the step output of the comparator $C_1$ and provides an output for activating output circuit $O_1$ for picking the relay $R_1$. This occurs as follows: capacitor 20 is normally charged to the output voltage of the comparator C, which in its standby condition, is about 5 volts. This output voltage is clamped by the action of diode 19 in the output circuit of the comparator $C_1$. When the output of the comparator $C_1$ suddenly goes negative towards zero at time $t_1$, the capacitor 20 discharges through diode 21 a very low resistance path through the resistor 22 and the internal circuitry of the amplifier $A_2$ of comparator $C_1$. As the output of the comparator $C_1$ goes positive at time $t_2$, the diode 21 is back-biased relative to the output of the comparator $C_1$ and the output, therefore, must charge capacitor 20 through the potentiometer 24 and diode 23. The potentiometer 24 is set to a value which when taken in combination with the value of capacitor 20, provides a substantially long time constant relative to the anticipated code rates and the capacitor 20 does not become fully charged between time $t_2$ and $t_3$. When fully charged, capacitor 20 maintains a bias on the transistor $Q_1$ such that it is conducting thereby drawing current from the base of transistor $Q_2$ and holding it in a cut off state. Similarly, transistor $Q_3$ is held cut off because the collector circuit of transistor $Q_2$ is not drawing current and therefore the base of transistor $Q_3$ is not biased to a conduction level. The output of the trigger $T_1$, therefore, is not sufficient to activate the output circuit $O_1$ including transistor $Q_4$ for picking the relay $R_1$. However, when the capacitor 20 discharges through the diode 21, transistor $Q_1$ becomes cut off because the cut off bias potential of the capacitor 20 has been discharged thereby activating the transistor $Q_1$ and regeneratively activating the transistors $Q_2$ and $Q_3$. With transistor $Q_3$ activated, base current is drawn from transistor $Q_4$ and it goes into a conductance state whereby the relay $R_1$ is picked. If the charging time of capacitor 20 is sufficiently high and if the pulses continue at a rate faster than the RC time constant of potentiometer 24 and capacitor 20, the output of the comparator $C_1$, the capacitor 20 cannot charge sufficiently to turn on the transistor $Q_1$ and, therefore, the output of the trigger $T_1$ remains on thereby keeping the output circuit $O_1$ energized for maintaining the relay $R_1$. The charge on capacitor 20 shown in FIG. 2 at D increases to a maximum $V_M$ as shown in the drawing at time $t_4$ when the pulses stop. Capacitor $C_3$ then becomes fully charged and the output of the trigger circuit $T_1$ becomes cut off and the relay $R_1$ is dropped out by the deactivation of the output circuit $O_1$.

The checking circuits of the present disclosures are shown with respect to FIG. 1A. Each of the circuits or sets including a filter, comparator, trigger, output circuit and relay operate similarly. The relays $R_1$ through $R_6$ are shown in the drawing as well as relays $R_A$ and $R_L$ and $R_{CK}$. As previously mentioned, outputs from the respective filters $F_1$ through $F_6$ at U through Z respectively are coupled to the inputs U through Z of the restrictive circuit $RC_1$. The circuit is designed such that only one set of contacts for each associated relay $R_1$–$R_6$ may be picked up any one time and if more than one set of contacts are picked simultaneously, only the most restrictive signal present at any one of the inputs may be transmitted to the comparator $C_A$ for transmission to the trigger $T_A$ and output circuit $O_A$ for picking relay $R_A$. If, for example, a signal is only present at the input V representing a low speed signal and the relays $R_1$ and $R_2$ are picked. No signal output will occur to the input for comparator $C_A$ and consequently the relay $R_A$ will be dropped because no signal is present at U (the most restrictive output) and the signal present at V is cut off by the action of picked relay $R_1$. If, for example, the input to the restrictive circuit $RC_1$ is activated at Y and V simultaneously with the relay $R_4$ activated, the signal at V will pass the circuit $RC_1$ but not the signal at Y. While this restrictive circuit permits a most restrictive signal to pass, it does not provide an alert when two signals are present simultaneously. This, however, is only one of many checks which are incorporated into this system and such an occurrence is accounted for in the other portions of the system as will be explained below.

A second checking circuit called a "one and only circuit" O—O is shown in FIG. 1A and appropriately labelled. This circuit includes a source of energy from the (+) through the conductors to an output relay $R_{CK}$ if more than one of the relays $R_1$ through $R_6$ are activated simultaneously the relay $R_{CK}$ becomes deenergized. In addition, unless the relays $R_A$ and $R_L$ are simultaneously either energized or deenergized, the relay $R_{CK}$ becomes deenergized. It is necessary for the relays $R_A$ and $R_L$ to be energized simultaneously because these relays, as previously described, respectively check that a signal is present at one of the outputs of the filters and that the signals that are present are within the frequency range of the low pass filter $F_L$ which is responsive to a range of frequencies anticipated for this particular application.

A third checking circuit is used to control inputs to a governor appropriately labelled in the drawing of FIG. 1A. Inputs to the governor control impedances $Z_G$ which when coupled to the primary input I through the array of contacts of a second restrictive circuit $RC_2$, controlled by the relays $R_1$ through $R_6$ and $R_A$, $R_L$ and $R_{CK}$, permit a signal to be transmitted to the governor which signal represents the maximum allowable speed. In this case, the contacts associated with the relays $R_1$ through $R_6$ will permit only the most restrictive signal to pass through the input of the governor I. On the other hand, relays $R_A$, $R_L$ and $R_{CK}$ are serially arrayed with this restrictive circuit $RC_2$ such that they, if any one of these relays are deenergized, the speed governor receives a signal operative for applying the vehicle brakes. It should be understood that while relay $R_{CK}$ is coupled to the governor as shown, it may be used to initiate an emergency stop condition. However, such an array mainly depends upon the requirements of the user. From this array of contacts controlled by associated relays, it can be seen that a triple check on the integrity of the system is provided by using multiple contacts of the same relays and a contact configuration which provides a logical check on the integrity of the system.

There has been therefore provided what is at present considered to be the preferred embodiment of the present invention and while it is obvious that various changes and modifications may be made therein, it is intended in the appended claims to cover all such modifications and changes that fall within the true spirit and scope of the invention.

What is claimed is:

1. A decoding system for providing a control signal in response to an input of one of a plurality of selected code rates, each of said code rates coded to designate a restrictive control signal varying from a most restrictive control signal to a least restricted control signal, wherein the improvement comprises:

a plurality of band-pass filtering means, each of said band-pass filtering means responsive to a code rate input for producing an output when the input is within the band of each of said filter means;

a plurality of comparator means each having a triggering level responsive to a corresponding one of said filter means output for producing a step signal when the amplitude of said corresponding filtering means output exceeds said triggering level;

said comparator including an amplifier triggered for producing its step output each time said filter output exceeds the triggering level, and cut-off for terminating the step output each time said filter output is less than said trigger level, thereby producing substantially a square wave output having a frequency in accordance with said code rate a plurality of output means, each output means coupled to a corresponding one of said comparator means for producing an output control signal when the corresponding one of said square wave outputs exceeds a minimum frequency; and a restrictive circuit having parallel inputs from each of said band-pass filtering means and switching means governed by said output control signals from said output means, said restrictive circuit providing means for conducting only the output from said band-pass filtering means corresponding to the most restrictive control signal.

2. The decoder of claim 1 wherein said band-pass filtering means comprises: an active filter selectively responsive for passing its associated input code rate and attenuating all other input code rates.

3. The decoder of claim 2 wherein said active filter includes: a passive filter network responsive to its associated input code rate and an operational amplifier having a feedback loop to said passive filter for maintaining the level of said passed code rate input to a level substantially equal to the input level.

4. The decoder of claim 1 further including: output triggering means for each comparator responsive to said square wave output for producing said control signal.

5. The decoder of claim 4 wherein said output triggering means comprises: a Schmitt trigger activated for producing a set output in accordance with said square wave signal and for producing a reset output at a different level than said set output when said square wave signal is less than the minimum rate.

6. The decoder of claim 5 wherein said Schmitt trigger includes: a charging circuit including a resistor and capacitor charged for biasing the first of a plurality of transistor stages to a conductance state in accordance with the unstepped output of the comparator and discharged in accordance with the stepped output of the capacitor for biasing the transistor into a conductance state.

7. The decoder of claim 6 wherein said Schmitt trigger includes: second and third transistor stages both regeneratively driven to conductance states for producing said reset output when said first stage is in a nonconductance state and both driven to a non-conductance state for producing said set output when said first transistor stage is in a conductance state.

8. The decoder of claim 7 wherein said output triggering means further includes: an output device normally active for inhibiting the control signal in response to the reset output of said Schmitt trigger and deactivated for generating said control in response to the set output of said Schmitt trigger.

9. The decoder of claim 8 wherein said output device includes: a transistor having a conductance and non-conductance state in accordance with the reset and set output condition of said Schmitt trigger respectively; and a relay energized and deenergized for opening and closing its front contact in accordance with the respective conductance and non-conductance states of the transistor, the closing of said front contact providing the control signal.

10. The decoder of claim 1 further including: a one and only circuit having an energy input and including additional switching means governed by the output means for conducting the input energy to its output only is one of said switching means is activated; and output check means energized in accordance with the output of said one and only circuit to produce a one and only check signal.

11. The decoder of claim 10 for governing the operation of a vehicle in accordance with the control signals further including:

a speed governor having an input varied for controlling the speed of the vehicle including: impedance means varied in accordance with said output means for controlling the input to said governor; and a second restrictive circuit having its input coupled in parallel with said impedance at various levels of impedance, said restrictive circuit including further, additional switching means governed by the output means for coupling only the most restrictive impedance level to the speed governor.

12. The decoder of claim 11 wherein said second restrictive circuit includes: a check switching means for each of the output check means, any rate check means and third output check means and governed thereby, serially coupled with said restrictive circuit for decoupling the impedance means from the governor input unless each of the above recited check means are activated for closing said check switching means.

13. The decoder of claim 11 wherein said one and only circuit includes: additional check switching means for each of said output check means and said any rate check means and governed thereby, serially coupled with said one and only circuit for decoupling said third check means from said one and only circuit unless each of the above recited check means are activated for closing said additional check switching means.

* * * * *